US008530780B2

(12) United States Patent
Lin et al.

(10) Patent No.: US 8,530,780 B2
(45) Date of Patent: Sep. 10, 2013

(54) DIRECT CURRENT STEAM PLASMA TORCH AND METHOD FOR REDUCING THE EROSION OF ELECTRODES THEREOF

(75) Inventors: Deng-Lian Lin, Tainan County (TW); Chin-Ching Tzeng, Taoyuan County (TW)

(73) Assignee: Atomic Energy Council-Institute of Nuclear Research, Lungtan, Taoyuan County (TW)

( * ) Notice: Subject to any disclaimer, the term of this patent is extended or adjusted under 35 U.S.C. 154(b) by 23 days.

(21) Appl. No.: 13/548,812

(22) Filed: Jul. 13, 2012

(65) Prior Publication Data

US 2012/0279945 A1 Nov. 8, 2012

Related U.S. Application Data

(62) Division of application No. 12/149,085, filed on Apr. 25, 2008, now Pat. No. 8,269,134.

(51) Int. Cl.
*B23K 10/00* (2006.01)

(52) U.S. Cl.
USPC .............. 219/121.5; 219/121.52; 219/121.59; 219/121.48

(58) Field of Classification Search
CPC ....................................................... B23K 10/00
USPC ............... 219/121.36, 121.49, 121.5, 121.51, 219/121.52, 121.48, 121.59, 75; 313/231.441, 313/231.51
See application file for complete search history.

(56) References Cited

U.S. PATENT DOCUMENTS

| | | | | |
|---|---|---|---|---|
| 4,625,092 | A * | 11/1986 | Camacho et al. | 219/121.48 |
| 5,147,998 | A * | 9/1992 | Tsantrizos et al. | 219/121.5 |
| 6,255,616 | B1 * | 7/2001 | Offer | 219/72 |
| 2007/0108165 | A1 * | 5/2007 | Petrik et al. | 219/121.5 |
| 2011/0024397 | A1 * | 2/2011 | Lin et al. | 219/121.5 |

* cited by examiner

*Primary Examiner* — Mark Paschall
(74) *Attorney, Agent, or Firm* — Jackson IPG PLLC

(57) ABSTRACT

A DC steam plasma torch includes front, middle and rear sections. The front section includes a first amount and a first electrode attached to the first amount, thus defining co-axial first internal and external coolant channels. The middle section includes a second mount and a second electrode co-axially connected to the second mount, thus defining co-axial second internal and external coolant channels. The rear section includes an insulating transient element connected to the second electrode, a window frame connected to the insulating transient element and a window provided in the window frame. A first swirl generator is provided between the first and second sections to receive primary working gas and generating a swirl in the same. A second swirl generator is provided between the middle and rear sections to receive auxiliary working gas and generating a swirl in the same.

6 Claims, 4 Drawing Sheets

DIRECT CURRENT STEAM PLASMA TORCH AND METHOD FOR REDUCING THE EROSION OF ELECTRODES THEREOF

CROSS-REFERENCE TO RELATED APPLICATION

This application is a divisional of U.S. application Ser. No. 12/149,085, filed on Apr. 25, 2008 and currently pending, to which priority is claimed and the contents of which are incorporated by reference in their entirety.

BACKGROUND OF INVENTION

1. Field of Invention

The present invention relates to a direct current ("DC") steam plasma torch and a method for reducing the erosion of electrodes thereof.

2. Related Prior Art

Plasma torches have been widely used in the metallurgy of special metal, the making of extremely fine particles and the changing of superficial properties. In the protection of the environment, plasma torches have been used to melt, pyrolyze or gasify flammable or non-flammable toxic waste, lowly radioactive waste, ash from incinerators or perfluorocompounds for de-toxication, volume reduction, solidification or conversion into resources.

As disclosed in U.S. Pat. Nos. 4,587,397 and 4,625,092 issued on 6 May 1986, working gas is only introduced into a DC plasma torch between front and rear electrodes of the DC plasma torch, and the rear electrode is a closed-loop gas supply system. A magnetic field may or may not be provided in the DC plasma torch. Where no magnetic field is provided, an arc does not move in a large area. Therefore, the area for the radiation of heat is small, and the thermal load on the front and rear electrodes are heavy so that the front and rear electrodes can easily be melted. The working gas is dry gas such as air, nitrogen, argon or helium. Where air and nitrogen are used, there may be hazardous byproducts such as $NO_X$.

The present invention is therefore intended to obviate or at least alleviate the problems encountered in prior art.

SUMMARY OF INVENTION

It is an objective of the present invention to provide a durable DC steam plasma torch.

To achieve the foregoing objective, a DC steam plasma torch includes front, middle and rear sections. The front section includes a first amount and a first electrode attached to the first amount, thus defining co-axial first internal and external coolant channels. The middle section includes a second mount and a second electrode co-axially connected to the second mount, thus defining co-axial second internal and external coolant channels. The rear section includes an insulating transient element connected to the second electrode, a window frame connected to the insulating transient element and a window provided in the window frame. A first swirl generator is provided between the first and second sections to receive primary working gas and generating a swirl in the same. A second swirl generator is provided between the middle and rear sections to receive auxiliary working gas and generating a swirl in the same.

It is another objective of the present invention to provide a method for reducing the erosion of first and second electrodes of a DC steam plasma torch.

To achieve the foregoing objective, a negative high-voltage terminal of a DC power supply is connected to a helical coil via a conducting element. Another terminal of the DC power supply is connected to the first electrode. There is provided first coaxial thermostatic piping including a first swirl generator to introduce primary working gas into the first and second electrodes. There is provided a trigger generator to generate a discharge arc between the first and second electrodes. The current and the flow rate of the primary working gas are gradually increased to cause an arc root to enter the internal side of the first and second electrodes to generate a high-speed swirl on the internal side of the first and second electrodes. There is provided second thermostatic piping including a second swirl generator to introduce auxiliary working gas into the second electrode periodically to regulate the pressure in the rear electrode to move the arc root to and fro axially. There is provided an inlet conduit to introduce pulsed and pressurized air into the second electrode to clean the internal side of the second electrode of residual powder to retain the normal distribution of a current filed in the second electrode to stabilize the properties of the operation of the DC steam plasma torch.

Other objectives, advantages and features of the present invention will become apparent from the following description referring to the attached drawings.

BRIEF DESCRIPTION OF DRAWINGS

The present invention will be described via detailed illustration of the two embodiments referring to the drawings.

DETAILED DESCRIPTION OF PREFERRED EMBODIMENT

Figure 1:
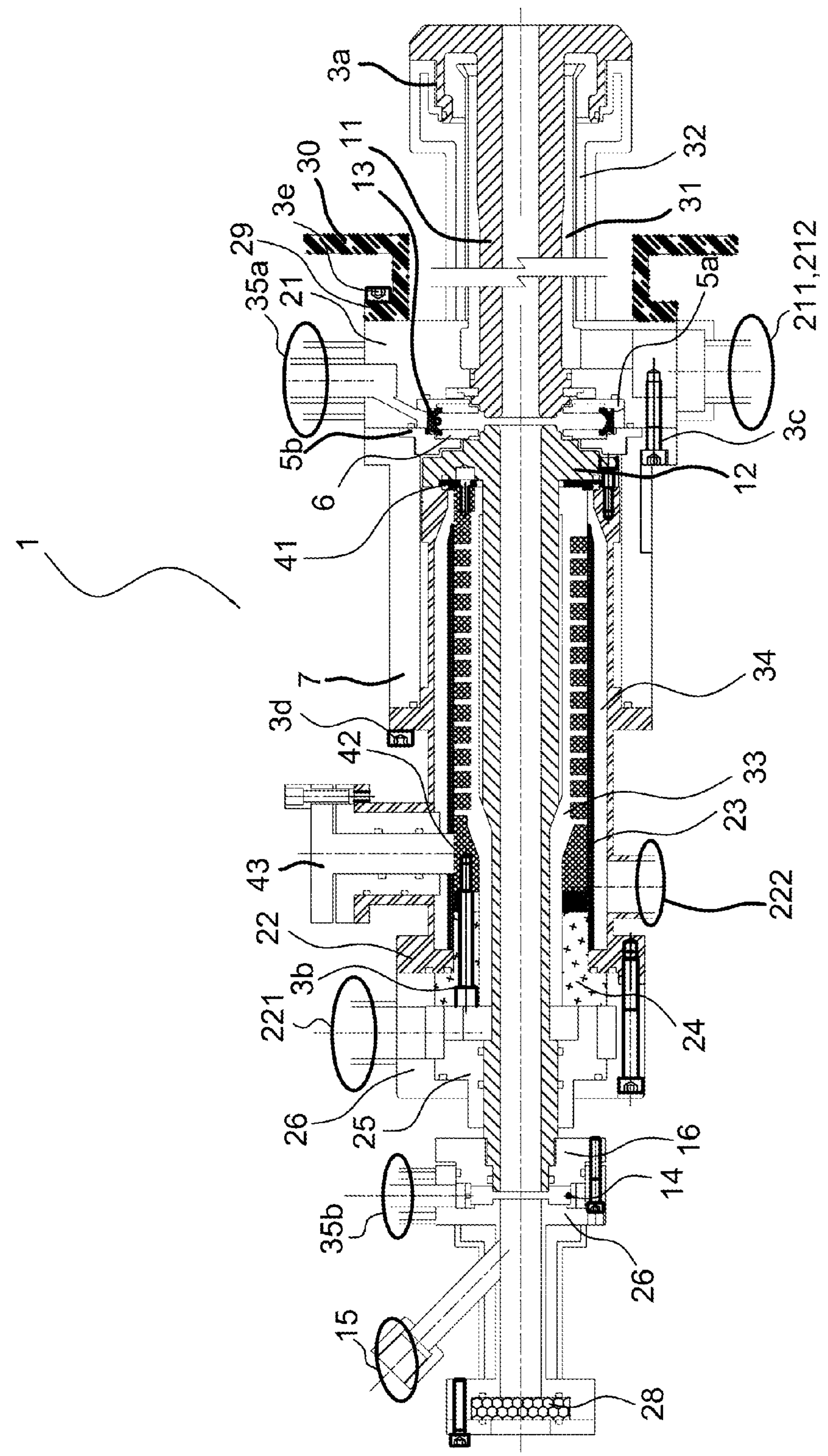
FIG. 1 is a cross-sectional view of a DC steam plasma torch according to the preferred embodiment of the present invention.

Referring to FIG. 1, a DC steam plasma torch 1 includes a front section, a middle section and a rear section according to the preferred embodiment of the present invention. There is a first swirl (or "vortex") generator 13 between the front and middle sections. There is a second swirl generator 14 between the middle and rear sections.

The front section of the DC steam plasma torch 1 includes a first electrode 11 and a first mount 21. Both of the first electrode 11 and the first mount 21 are tubular. With a threaded bolt 3*a*, the first electrode 11 is co-axially connected to the first mount 21, thus defining a first internal channel 31 and a first external channel 32. Coolant can travel in the first internal channel 31 and the first external channel 32.

Figure 2:
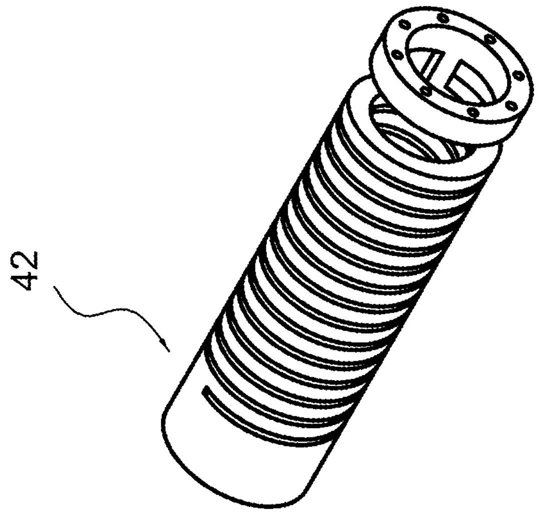
FIG. 2 is a perspective view of a helical coil of the DC steam plasma torch shown in FIG. 1.

The middle section of the DC steam plasma torch 1 includes a second electrode 12 and a second mount 22. Both of the second electrode 12 and the second mount 22 are tubular. The second electrode 12 is co-axially connected to the second mount 22, thus defining a second internal channel 33 and a second external channel 34. A conductive transient element 41 is provided between an annular portion of the second electrode 12 and a front end of the second mount 22. A helical coil 42 (FIG. 2) is provided around the second electrode 12 and connected to the conductive transient element 41. The helical coil 42 is used to generate a magnetic field. A jacket 23 is provided around the helical coil 42. An insolating ring 24 is connected to the jacket 23 and the helical coil 42 with a threaded bolt 3*b*. An insulating alignment element 25 is connected to the insolating ring 24. The second electrode 12 is aligned with the first electrode 11 by the insulating alignment element 25. A third mount 26 is connected to the insulating alignment element 25. The third mount 26 is provided around the insulating alignment element 25 and the isolating ring 24.

The rear section of the DC steam plasma torch 1 includes an inlet conduit 15, an insulating transient element 16, a window frame 27 and a window 28. The insulating transient element 16 is connected to the rear electrode 12 with threaded bolts. The window 28 is made of quartz glass. The window 28 is located at the rear end of the DC steam plasma torch 1 so that the discharge of plasma and the erosion of the first electrode 11 and the second electrode 12 are visible.

Primary working gas is provided into the DC steam plasma torch 1 through the first swirl generator 13. The primary working gas is steam. A swirl is generated in the first swirl generator 13. The first swirl generator 13 includes a nozzle made of tool steel subjected to thermal processing. The nozzle of the first swirl generator 13 is about 5 to 10 degrees biased towards the axis of the first swirl generator 13.

Auxiliary working gas is provided into the DC steam plasma torch 1 through the second swirl generator 14. The auxiliary working gas is steam. A swirl is generated in the second swirl generator 14. The auxiliary working gas is periodically added to the primary working gas to adjust the pressure. The second swirl generator 14 includes a nozzle made of tool steel subjected to thermal processing. The nozzle of the second swirl generator 14 is about 5 to 10 degrees biased towards the axis of the second swirl generator 14.

Periodically, pulsed and pressurized air travels into the second electrode 12 through the inlet conduit 15. The pulsed and pressurized air cleans the interior of the second electrode 12.

Refractory insulating elements 5*a* and 5*b* and a refractory ultraviolet-resisting insulating element 6 are provided around the first swirl generator 13. The center of the nozzle of the first swirl generator 13 is aligned to the middle point of a gap between the first electrode 11 and the second electrode 12. The refractory insulating elements 5*a* and 5*b* are made of quartz glass and polytetrafluoroethylene ("PTFE").

An insulating sleeve 7 is connected to the first mount 21 with a threaded bolt 3*c* and connected to the second mount 22 with another threaded bolt 3*d*.

Figure 3:
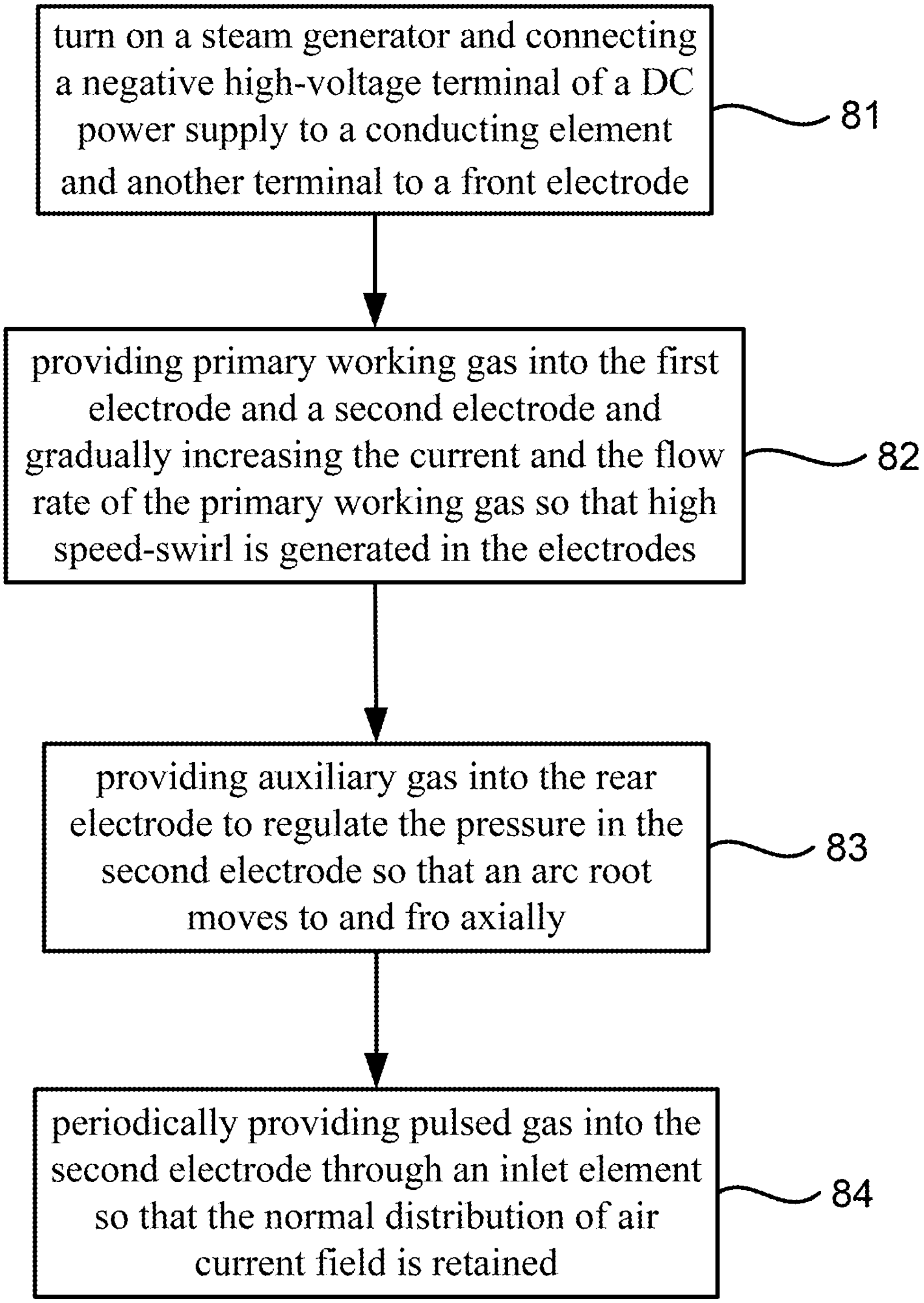
FIG. 3 is a flow chart of a method for reducing the erosion of electrodes of the DC steam plasma torch shown in FIG. 1.
Figure 4:
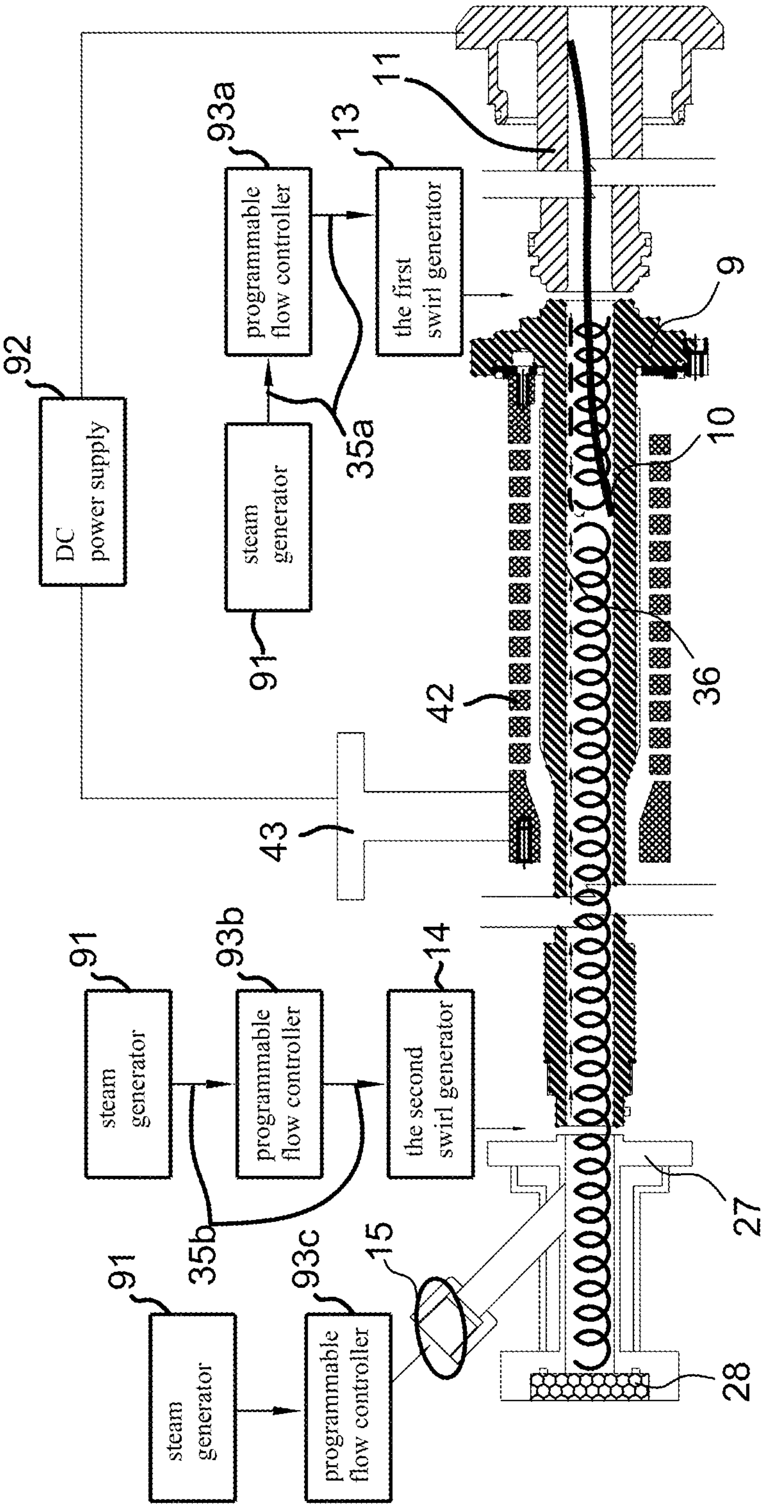
FIG. 4 is another cross-sectional view of the DC steam plasma torch shown in FIG. 1 for illustrating the operation.

Referring to FIGS. 3 and 4, there is shown a method for reducing the erosion of the first electrode 11 and the second electrode 12 of the DC steam plasma torch 1. An interface 29 of the DC steam plasma torch 1 is connected to a reactor 30 by a threaded bolt 3*e*. A front portion of the interface 29 is exposed to the interior of the reactor 30 and operated in a non-transmitting mode.

At 81, a steam generator 91 is activated. As the coolant, hot water of 80 to 90 degrees Celsius travels into the DC steam plasma torch 1 through an inlet 211 in the first mount 21 and an inlet 222 in the second mount 22. The coolant travels through the first external channel 32 and the second external channel 34. Finally, the coolant returns to the steam generator 91 through an outlet 212 in the front mount 21 and an outlet 222 in the second mount 22. Thus, a closed circulation system is formed. A negative high voltage terminal of a DC power supply 92 is connected to the helical coil 42 via a conducting element 43. Another terminal of the DC power supply 92 is connected to the first electrode 11. The conducting element 43, the helical coil 42 and the conductive transient element 41 together form a magnetic field module.

At 82, under the control of a programmable flow controller 93*a*, the primary working gas travels into the first swirl generator 13 through the first internal channel 31. The direction of the movement of an arc root is consistent with the direction of the swirl in the first swirl generator 13 so that the swirl enters the first electrode 11 and the second electrode 12. A pulsed or radio-frequency high voltage trigger generator causes the first electrode 11 and the second electrode 12 to provide arc ignition. The current and the flow rate of the primary working gas are gradually increased. An arc root 10 is directed to an internal side 36 of the first electrode 11 and the second electrode 12. Not only the arc resistance is increased to increase the power, but also low-voltage zones are generated in the first electrode 11 and the second electrode 12. Thus, a high-speed swirl is generated on the internal side 36 of the first electrode 11 and the second electrode 12 to stabilize the arc and cool the internal side 36 of the first electrode 11 and the second electrode 12.

At 83, under the control of a programmable flow controller 93*b*, from time to time, at different flow rates, the auxiliary working gas travels into the second swirl generator 14 through the second internal channel 33 of a thermostatic piping 35*b*. The auxiliary working gas periodically travels into the second electrode 12 from the second swirl generator 14. The pressure in the second electrode 12 is regulated. The arc root 10 travels to and fro axially in the second electrode 12. Thus, the area of the scanning by the arc root 10 is increased while the thermal load on the second electrode 12 is reduced so that the effective mass of the second electrode 12 available for erosion is increased.

At 84, under the control of a programmable flow controller 93*c*, in regular short intervals, pulsed and pressurized gas travels into the second electrode 12 through the inlet conduit 15. The pulsed and pressurized gas cleans the internal side 36 of the second electrode 12 of residual copper compound or oxide. Thus, the normal distribution of air current field in the second electrode 12 is retained. The properties of the operation of the DC steam plasma torch 1 is stabilized.

As the steam is used as the working gases, the production of the nitrogen oxide produced by the DC steam plasma torch 1 is very limited. The DC steam plasma torch 1 is a highly chemically active clean heat source that provides plasma at a high temperature of 4000 to 10000 degrees Celsius, a high plasma density of $10^{16}$ #/$cm^3$ and a high energy density 5 to 20 MJ/kg. The plasma contains a lot of hydrogen atoms, oxide atoms and $OH^-$ radicals. The DC steam plasma torch 1 effectively turns toxic waste into organic substances, produces synthetic gas and stabilizes lava that can be turned into resources, thus completely turning the toxic waste into resources. The DC steam plasma torch 1 is reliable and durable. The time interval between two activities of maintenance is long so that the cost in the operation of the DC steam plasma torch 1 is low. Hence, the reliability and workability of the DC steam plasma torch 1 are increased.

Moreover, the problems addressed in the RELATED PRIOR ART are overcome by the method according to the present invention because the arc root 10 periodically moves in a large area of the internal side 36 of the electrodes 11 and 12. Thus, the effective mass of the electrodes 11 and 12 available for erosion is large. Therefore, the lives of the electrodes 11 and 12 are long.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for reducing the erosion of first and second electrodes of a DC steam plasma torch, the method comprising the steps of:

providing a steam generator to provide coolant;

connecting a negative high-voltage terminal of a DC power supply to a helical coil via a conducting element;

connecting another terminal of the DC power supply to the first electrode;

providing first coaxial thermostatic piping comprising a first swirl generator to introduce primary working gas into the first and second electrodes;

providing a trigger generator to generate a discharge arc between the first and second electrodes;

gradually increasing the current and the flow rate of the primary working gas;

causing an arc root to enter the internal side of the first and second electrodes to generate a high-speed swirl on the internal side of the first and second electrodes;

providing second thermostatic piping comprising a second swirl generator to introduce auxiliary working gas into the second electrode periodically to regulate the pressure in the rear electrode to move the arc root to and fro axially;

providing an inlet conduit to introduce pulsed and pressurized air into the second electrode to clean the internal side of the second electrode of residual powder to retain the normal distribution of a current filed in the second electrode to stabilize the properties of the operation of the DC steam plasma torch.

2. The method according to claim 1, wherein as different currents are conducted to the DC steam plasma torch, different axial magnetic fields are generated to induce different tangential magnetic forces along the internal side of the second electrode so that the arc root moves in circles.

3. The method according to claim 1, wherein the first piping comprises a first internal coolant channel for transferring the primary and auxiliary gases and a first external coolant channel for returning the primary and auxiliary gases back into the steam generator.

4. The method according to claim 1, wherein the second piping comprises a second internal coolant channel for transferring the primary and auxiliary gases and a second external coolant channel for returning the primary and auxiliary gases back into the steam generator.

5. The method according to claim 1, wherein the primary and auxiliary working gases are selected from a group consisting of overheated steam, nitrogen, argon and air.

6. The method according to claim 1, wherein the second electrode is tubular.

* * * * *